Patented Apr. 5, 1949

2,466,450

UNITED STATES PATENT OFFICE 2,466,450

PIPE PUTTY COMPOSITION

Isidore Levinson, Brooklyn, N. Y.

No Drawing. Application January 22, 1946,
Serial No. 642,785

3 Claims. (Cl. 260—17.3)

This invention relates to a composition to be used in the finishing of smoking pipes, and more specifically to be used for the purpose of filling unsightly cavities, and smoothing out and masking irregularities in the wooden part of the pipe.

A composition of this class should be easy to mold into the cavities, should adhere to the wood firmly during the final operations of sandpapering, polishing, and varnishing the pipe, should be capable of acquiring any desired color and a smooth finish, and should be sufficiently heatproof and wear-resistant, so that it will not become loose, dislodged, or depressed, or undergo any alterations that would reveal the imperfections which the composition is intended to mask.

A typical example of the compositions hitherto known is a mixture of plaster of Paris and whiting with pipe varnish and alcohol. The purpose of the latter two ingredients is to render the mixture plastic enough for hand-molding and suitable for receiving and retaining the final coloring. Such compositions are defective, mainly in that they become loose or depressed while the pipe is receiving the final polishing, or fall out later while it is being used. My composition, on the contrary, possesses all of the desirable features listed above, and in addition is easier to apply, safer, and cheaper, by reason of the absence of expensive, highly volatile, and inflammable organic fluids.

An object of my invention is to provide a pipe putty composition which will adhere firmly to the wood of the pipe, and not become worn or dislodged, either during the operation of finishing the pipe subsequent to the application of the putty, or thereafter during the life of the pipe.

Another object of my invention is to provide a pipe putty composition which requires only the addition of water, without any organic or special solvent, to furnish a plastic mass that can be easily molded into the cavities and imperfections of the wood, thus facilitating and rendering more economical the phase of pipe finishing in which it is employed.

A further object is to provide a pipe putty composition wherein the final coloring matter may be incorporated prior to the application thereof to the pipe, and will be retained, permitting of a perfect staining of the pipe, without the use of any organic or special solvents.

I have found that a composition fully attaining the objects set forth above may be prepared by employing a water-soluble urea-formaldehyde condensation product, a hardening agent, an inert filler preferably of the cellulose class, such as wood flour, tartaric acid or cream of tartar, crocus of Mars, and a pigment or pigments chosen so as to impart the final color desired.

Water-soluble urea-formaldehyde condensation products are obtained at an intermediate stage of the manufacture of urea-formaldehyde plastics. It is known that such condensation products may be caused to set without the application of heat by dissolving them in water, and rendering the solution acid by means of an acid catalyst, or hardening agent. The most commonly used of such catalysts are ammonium salts, such as ammonium chloride, ammonium thiocyanate, or ammonium sulphate. A combination of any one of a special group of ammonium salts, which includes the sulphate, with a urea-formaldehyde condensation product for use as a glue or a coating is disclosed and claimed in U. S. Patent 2,312,210 to Dearing. Some hardening agents will cause the urea-formaldehyde condensation product to harden somewhat when mixed thereto even in the dry state, and therefore must be added to the composition shortly before use. Others on the contrary can be added to form a stable dry mixture, which will not begin to harden until it is dissolved. There is a variety of urea-formaldehyde condensation products on the market, either premixed with a hardening agent, or to be mixed therewith by the user in the proportions indicated by the manufacturer, and which depend on the particular substances employed.

It is to be understood that I am not claiming as my invention any particular mixture of a urea-formaldehyde condensation product with a hardening agent, but only the combination of any such mixture with the other specific ingredients set forth herein for the specific purpose of forming through the addition of water a plastic putty suitable for use in the finishing of smoking pipes.

The proportion of the urea condensation product, together with its catalyst, with respect to the other ingredients, influences the time required for the composition to dry and harden, and the plasticity of the composition prior to hardening. Thus, while a condensation product content somewhat higher or lower than optimum might still afford a putty-like composition, the pipe patcher using such a composition would find it harder and more difficult to mold, or slower to dry. Either effect would be detrimental to quick and economical patching, and the appearance of the finished patches would not be satisfactory.

It should be remarked here that the verb "to mold" as used throughout this description refers solely to a hand-molding operation, and does not imply the use of molds, pressure other than manual, or heat.

I have found that proportions such as given in the following example furnish most satisfactory results. Such proportions however are not quite rigid, because there are available on the market many substantially equivalent, but not identical, ingredients, and furthermore variations of approximately 10% in either direction from the given proportions are permissible without seriously affecting the properties of the putty.

*Example*

| | Parts by weight |
|---|---|
| Urea-formaldehyde condensation product plus catalyst | 40 |
| Cellulose filler | 8 |
| Cream of tartar | 1 |
| Crocus of Mars | 8 |

Coloring matter is added as desired, and water to obtain the desired paste-like consistency.

A putty according to the above example has a good plasticity, can be molded with speed and ease, will dry in about ten hours without the help of heating or ventilation, and without developing cracks, and will not become worn or dislodged during the finishing or the use of the pipe. Attempts to hurry the drying beyond the optimum limit for any given proportion of the ingredients would result in uneven drying and cracking of the putty.

It is to be understood that I do not wish to be limited to the exact details herein set forth inasmuch as alternations and variations are possible within the spirit of my invention and the scope of the claims.

I claim:

1. A composition for use in the manufacture of smoking pipes, capable of forming a plastic putty through the addition of water, which putty hardens upon being allowed to dry at room temperature, comprising a water-soluble cold-setting urea-formaldahyde reaction product, a hardening agent, a cellulose filler, a substance taken from the group consisting of tartaric acid and cream of tartar, and crocus of Mars.

2. A composition for use in the manufacture of smoking pipes, capable of forming a plastic putty when water is added thereto, which putty hardens upon being allowed to dry at room temperature, comprising 40 parts by weight of a mixture of a water-soluble cold-setting urea-formaldehyde reaction product and a hardening agent, 8 parts of wood flour, 1 part of cream of tartar, and 8 parts of crocus of Mars.

3. A composition for use in the manufacture of smoking pipes, capable of forming a plastic putty when water is added thereto, which putty hardens upon being allowed to dry at room temperature, compising the following constituents in the following proportions within 10%: 40 parts by weight of a mixture of a water-soluble cold-setting urea formaldehyde reaction product and a hardening agent, 8 parts of wood flour, 1 part of cream of tartar, and 8 parts of crocus of Mars.

ISIDORE LEVINSON.

REFERENCES CITED

The following references are of record in the file of this patent:

UNITED STATES PATENTS

| Number | Name | Date |
|---|---|---|
| 1,482,357 | Ellis | Jan. 29, 1924 |